United States Patent
Krishnamoorthy (10) Patent No.: US 11,551,448 B2
(45) Date of Patent: Jan. 10, 2023

(54) SYSTEM FOR PRESERVING IMAGE AND ACOUSTIC SENSITIVITY USING REINFORCEMENT LEARNING

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 286 days.

(21) Appl. No.: 17/060,124

(22) Filed: Oct. 1, 2020

(65) Prior Publication Data
US 2022/0108110 A1 Apr. 7, 2022

(51) Int. Cl.
| | |
|---|---|
| G06N 3/08 | (2006.01) |
| G06N 3/04 | (2006.01) |
| G06K 9/62 | (2022.01) |
| G06V 20/40 | (2022.01) |
| G06F 16/45 | (2019.01) |
| G06F 16/435 | (2019.01) |
| G06V 10/88 | (2022.01) |
| G06V 10/75 | (2022.01) |

(52) U.S. Cl.
CPC .......... *G06V 20/41* (2022.01); *G06F 16/435* (2019.01); *G06F 16/45* (2019.01); *G06K 9/6257* (2013.01); *G06N 3/08* (2013.01); *G06V 10/751* (2022.01); *G06V 10/88* (2022.01)

(58) Field of Classification Search
CPC ...... G06V 20/41; G06V 10/751; G06V 10/88; G06F 16/435; G06F 16/45; G06K 9/6257; G06N 3/08
See application file for complete search history.

(56) References Cited

U.S. PATENT DOCUMENTS

| | | | |
|---|---|---|---|
| 9,754,351 | B2 | 9/2017 | Palur et al. |
| 9,767,848 | B2 | 9/2017 | Cunningham |
| 10,083,355 | B2 | 9/2018 | Subbian et al. |
| 10,163,193 | B2 | 12/2018 | Berenger et al. |
| 10,198,637 | B2 | 2/2019 | Tran et al. |
| 10,325,154 | B2 | 6/2019 | Barak et al. |
| 10,360,498 | B2 | 7/2019 | Fergus et al. |
| 10,445,558 | B2 | 10/2019 | Huang et al. |

(Continued)

*Primary Examiner* — David F Dunphy
(74) *Attorney, Agent, or Firm* — Moore & Van Allen PLLC; Anup Shrinivasan Iyer (57) ABSTRACT

Systems, computer program products, and methods are described herein for preserving image and acoustic sensitivity using reinforcement learning. The present invention is configured to initiate a file editing engine on the audiovisual file to separate the audiovisual file into a video component and an audio component; initiate a convolutional neural network (CNN) algorithm on the video component to identify one or more sensitive portions in the one or more image frames; initiate an audio word2vec algorithm on the audio component to identify one or more sensitive portions in the audio component; initiate a masking algorithm on the one or more image frames and the audio component; generate a masked video component and a masked audio component based on at least implementing the masking action policy; and bind, using the file editing engine, the masked video component and the masked audio component to generate a masked audiovisual file.

18 Claims, 2 Drawing Sheets

(56) References Cited

U.S. PATENT DOCUMENTS

| | | | |
|---|---|---|---|
| 10,474,923 B2 | 11/2019 | Ray et al. | |
| 10,496,750 B2 | 12/2019 | Dimson et al. | |
| 10,572,771 B2 | 2/2020 | Tang et al. | |
| 10,592,807 B2 | 3/2020 | Brewer et al. | |
| 10,839,574 B1 | 11/2020 | Smallwood et al. | |
| 10,878,579 B2 | 12/2020 | Paluri | |
| 11,216,517 B1 * | 1/2022 | Ahmed | G06F 16/51 |
| 2002/0147782 A1 * | 10/2002 | Dimitrova | H04N 21/4394 |
| | | | 709/207 |
| 2003/0165320 A1 * | 9/2003 | Ogawa | G11B 27/105 |
| | | | 386/338 |
| 2017/0046613 A1 | 2/2017 | Paluri et al. | |
| 2017/0147883 A1 | 5/2017 | Prosek | |
| 2018/0012236 A1 | 1/2018 | Zhuo et al. | |
| 2018/0032898 A1 | 2/2018 | Wu et al. | |
| 2018/0136797 A1 | 5/2018 | Dickens et al. | |
| 2018/0157759 A1 | 6/2018 | Zheng et al. | |
| 2019/0043074 A1 | 2/2019 | Peysakhovich et al. | |
| 2019/0043075 A1 | 2/2019 | Peysakhovich et al. | |
| 2021/0201934 A1 * | 7/2021 | Lyu | G06Q 50/30 |

\* cited by examiner

SYSTEM FOR PRESERVING IMAGE AND ACOUSTIC SENSITIVITY USING REINFORCEMENT LEARNING

FIELD OF THE INVENTION

The present invention embraces a system for preserving image and acoustic sensitivity using reinforcement learning.

BACKGROUND

Large amount of video data are ubiquitously generated in personal devices and dedicated video recording facilities on a daily basis. Analyzing such data would be extremely beneficial in real world through robust machine learning techniques. However, such audiovisual files may contain private, sensitive information which are not authorized for transmission and/or display.

There is a need for a system for preserving image and acoustic sensitivity using reinforcement learning.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for preserving image and acoustic sensitivity using reinforcement learning is presented. The system comprising: at least one non-transitory storage device; and at least one processing device coupled to the at least one non-transitory storage device, wherein the at least one processing device is configured to: electronically retrieve an audiovisual file from a data repository; initiate a file editing engine on the audiovisual file to separate the audiovisual file into a video component and an audio component, wherein the video component comprises one or more image frames; initiate a convolutional neural network (CNN) algorithm on the video component to identify one or more sensitive portions in the one or more image frames; initiate an audio word2vec algorithm on the audio component to identify one or more sensitive portions in the audio component; initiate a masking algorithm on the one or more image frames and the audio component; generate, using the masking algorithm, a masking action policy; implement, using the masking algorithm, the masking action policy on the one or more sensitive portions in the one or more image frames and the one or more sensitive portions in the audio component; generate a masked video component and a masked audio component based on at least implementing the masking action policy; and bind, using the file editing engine, the masked video component and the masked audio component to generate a masked audiovisual file.

In some embodiments, the at least one processing device is further configured to: initiate a reinforcement learning algorithm on the one or more image frames, wherein initiating further comprises: observing a current state of a first frame, wherein the first frame is associated with the one or more image frames; initiating the masking algorithm on the first frame; implementing, using the masking algorithm, the masking action policy on the first frame to generate a masked first frame, wherein implementing the masking action policy changes the current state of the first frame to a next state, wherein the next state is a current state of the masked first frame; initiate the CNN algorithm on the masked first frame; and determine, using the CNN algorithm, a performance assessment output for the masked first frame based on at least implementing the masking action policy.

In some embodiments, the at least one processing device is further configured to: implement, using the masking algorithm, the masking action policy, wherein implementing further comprises: determining one or more spatial positions of one or more pixels associated with the one or more sensitive portions in the first frame; and implement a masking action on at least a portion of the one or more spatial positions of the one or more pixels associated with the one or more sensitive portions in the first frame to generate the masked first frame.

In some embodiments, the at least one processing device is further configured to: initiate an optimization policy engine on the performance assessment output for the masked first frame to optimize the masking action policy; and encode, using the optimization policy engine, the performance assessment output for the masked first frame into rewards and costs.

In some embodiments, the at least one processing device is further configured to: encode the performance assessment output into rewards and costs, wherein encoding further comprises: comparing one or more spatial positions of one or more pixels that have been masked in the masked first frame with the one or more spatial positions of the one or more pixels associated with the one or more sensitive portions in the first frame; determine a match between the one or more spatial positions of the one or more pixels that have been masked in the masked first frame and the one or more spatial positions of the one or more pixels associated with the one or more sensitive portions in the first frame; assigning a reward to the one or more spatial positions of the one or more pixels that have been masked in the masked first frame that matches the one or more spatial positions of the one or more pixels associated with the one or more sensitive portions in the first frame; and assigning a cost to the one or more spatial positions of the one or more pixels that have been masked in the masked first frame that does not match the one or more spatial positions of the one or more pixels associated with the one or more sensitive portions in the first frame.

In some embodiments, the at least one processing device is further configured to iteratively initiate the optimization policy engine on the performance assessment output for the first frame to optimize the masking action policy at each iteration, wherein iteratively initiating further comprises: encode, using the optimization policy engine, the performance assessment output for the first frame into rewards and costs at each iteration; aggregate the rewards and the costs from each iteration; and optimize, with each iteration, the masking action policy based on at least maximizing the aggregated reward and minimizing the aggregated cost.

In some embodiments, the at least one processing device is further configured to: initiate the audio word2vec algorithm on the audio component; segment, using the audio word2vec algorithm, the audio component into one or more audio portions; initiate a vectorization engine on the one or more audio portions; and map, using the vectorization engine, the one or more audio portions into a one or more fixed length audio portion vectors capable of being represented in a vector space.

In some embodiments, the at least one processing device is further configured to: electronically retrieve one or more pre-defined audio segments from an audio archive, wherein the one or more pre-defined audio segments comprises sensitive information; initiate the vectorization engine on the one or more pre-defined audio segments; and map, using the vectorization engine, the one or more pre-defined audio segments into one or more fixed length pre-defined audio segment vectors capable of being represented in the vector space.

In some embodiments, the at least one processing device is further configured to: determine a distance similarity metric between each of the one or more fixed length audio portion vectors and the one or more fixed length pre-defined audio segment vectors; compare the distance similarity metric with a predetermined threshold; and determine the one or more sensitive portions in the audio component based on at least comparing the one or more distance similarity metrics with the predetermined threshold.

In some embodiments, the at least one processing device is further configured to: determine at least a portion of the one or more audio portions with distance similarity metric that is less than the predetermined threshold; and determine that the one or more sensitive portions in the audio component are at least the portion of the one or more audio portions with the distance similarity metric that is less than the predetermined threshold.

In some embodiments, the at least one processing device is further configured to: implement, using the masking algorithm, the masking action policy on the one or more sensitive portions in the audio component.

In some embodiments, the at least one processing device is further configured to: electronically receive, from a computing device of a user, a request to view the audiovisual file; and transmit control signals configured to cause the computing device of the user to display the masked audiovisual file.

In yet another aspect, a computer program product for preserving image and acoustic sensitivity using reinforcement learning is presented. The computer program product comprising a non-transitory computer-readable medium comprising code causing a first apparatus to: electronically retrieve an audiovisual file from a data repository; initiate a file editing engine on the audiovisual file to separate the audiovisual file into a video component and an audio component, wherein the video component comprises one or more image frames; initiate a convolutional neural network (CNN) algorithm on the video component to identify one or more sensitive portions in the one or more image frames; initiate an audio word2vec algorithm on the audio component to identify one or more sensitive portions in the audio component; initiate a masking algorithm on the one or more image frames and the audio component; generate, using the masking algorithm, a masking action policy; implement, using the masking algorithm, the masking action policy on the one or more sensitive portions in the one or more image frames and the one or more sensitive portions in the audio component; generate a masked video component and a masked audio component based on at least implementing the masking action policy; and bind, using the file editing engine, the masked video component and the masked audio component to generate a masked audiovisual file.

In yet another aspect, a method for preserving image and acoustic sensitivity using reinforcement learning is presented. The method comprising: electronically retrieving an audiovisual file from a data repository; initiating a file editing engine on the audiovisual file to separate the audiovisual file into a video component and an audio component, wherein the video component comprises one or more image frames; initiating a convolutional neural network (CNN) algorithm on the video component to identify one or more sensitive portions in the one or more image frames; initiating an audio word2vec algorithm on the audio component to identify one or more sensitive portions in the audio component; initiating a masking algorithm on the one or more image frames and the audio component; generating, using the masking algorithm, a masking action policy; implementing, using the masking algorithm, the masking action policy on the one or more sensitive portions in the one or more image frames and the one or more sensitive portions in the audio component; generating a masked video component and a masked audio component based on at least implementing the masking action policy; and binding, using the file editing engine, the masked video component and the masked audio component to generate a masked audiovisual file.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Figure 1:
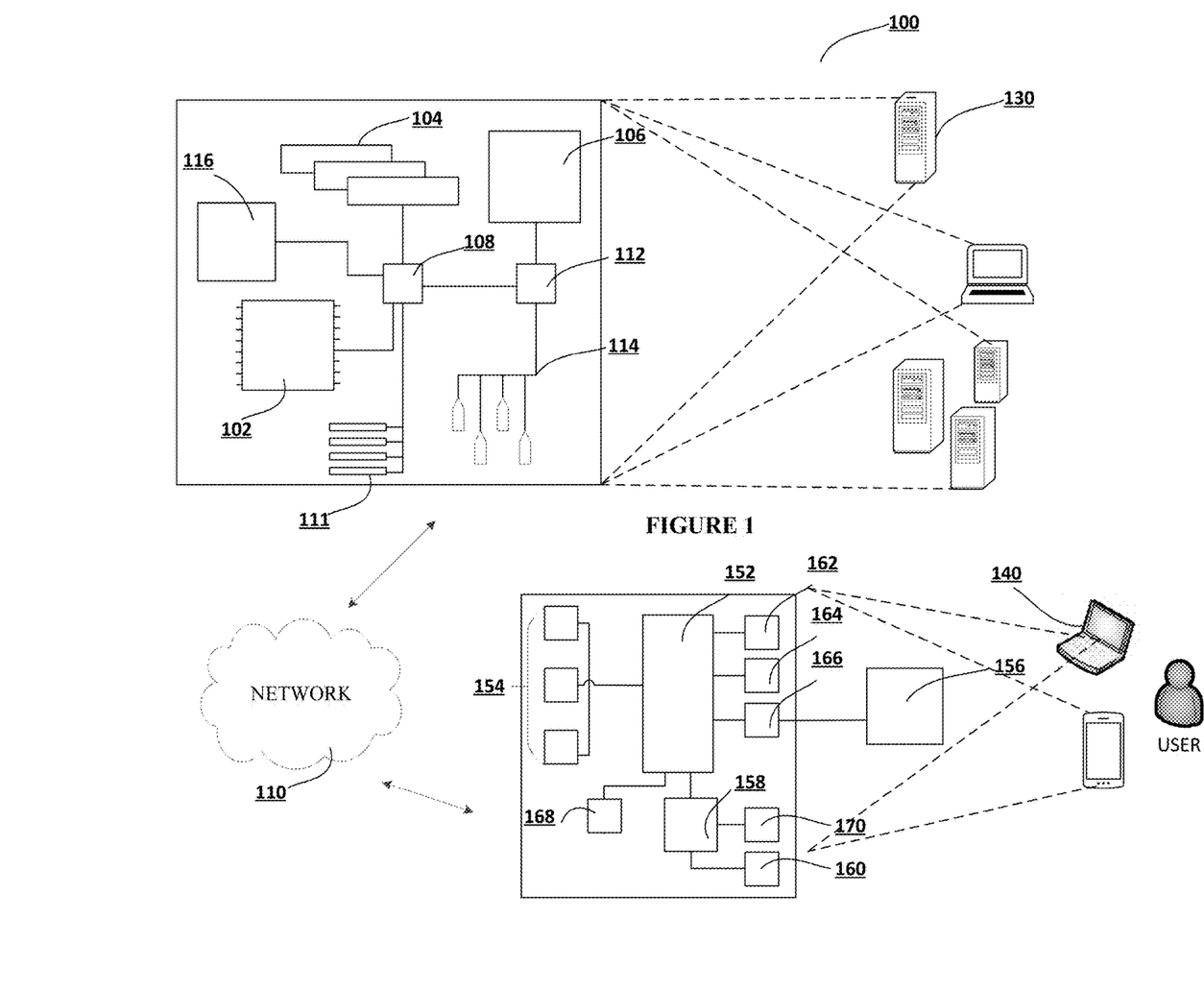
FIG. 1 illustrates technical components of a system for preserving image and acoustic sensitivity using reinforcement learning, in accordance with an embodiment of the invention.

FIG. 1 presents an exemplary block diagram of the system environment for preserving image and acoustic sensitivity using reinforcement learning 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Large amount of video data are ubiquitously generated in personal devices and dedicated video recording facilities on a daily basis. Analyzing such data would be extremely beneficial in real world through robust machine learning techniques. However, such audiovisual files may contain private, sensitive information which are not authorized for transmission and/or display. Existing video sanitization techniques simply obfuscate the video by detecting and blurring the region of interests without quantifying and bounding the privacy leakage in the sanitization. The present invention provides the functional benefit of using reinforcement learning to identify, localize, and mask the sensitive portions of each image frame in the video component of the audiovisual file. In addition, the present invention provides the functional benefit of using audio word2vec algorithms to identify sensitive portions in the corresponding audio component of the audiovisual file and mask the sensitive portions in the audio component.

Figure 2:
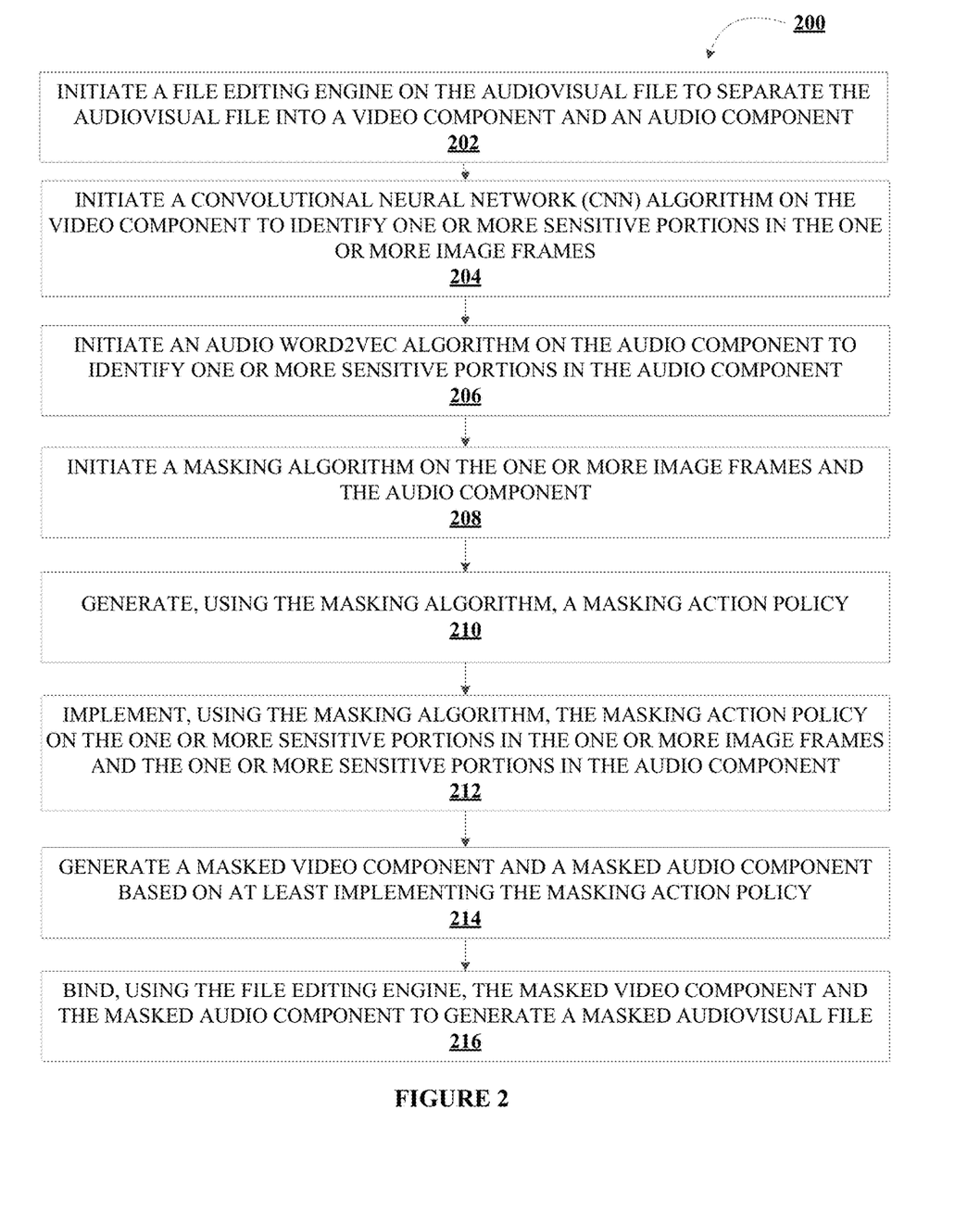
FIG. 2 illustrates a process flow for preserving image and acoustic sensitivity using reinforcement learning, in accordance with an embodiment of the invention.

FIG. 2 illustrates a process flow for preserving image and acoustic sensitivity using reinforcement learning 200, in accordance with an embodiment of the invention. As shown in block 202, the process flow includes initiating a file editing engine on the audiovisual file to separate the audiovisual file into a video component and an audio component. In some embodiments, the system may be configured to electronically retrieve an audiovisual file from a data repository. In some embodiments, the system may be configured to initiate the process flow(s) described herein on a real-time audiovisual feed. Once the audiovisual file is retrieved, system may be configured to initiate the file editing engine that is capable of manipulating the arrangement of audio components and visual components within an audiovisual file. In one aspect, the file editing engine may be configured to separate the audio component of the audiovisual file from the visual component and process them independently of each other.

Next, as shown in block 204, the process flow includes initiating a convolutional neural network (CNN) algorithm on the video component to identify one or more sensitive portions in the one or more image frames. This requires the video component to be split into one or more image frames. Accordingly, the system may be configured to initiate a video frame splitter algorithm on the video component to split the video component into one or more image frames for processing. In response to initiating the video splitter algorithm on the video component, the system may be configured to retrieve, using the video splitter algorithm, the one or more image frames. Once the audiovisual file is separated into its corresponding audio component and video component, the system may be configured to implement the CNN algorithm on the video component.

CNN is a Deep Learning algorithm which can take in an input image frame, assign importance (learnable weights and biases) to various aspects/objects in the image frame and be able to differentiate one from the other. Typically, the CNN consists of an input and an output layer, as well as multiple hidden layers. The hidden layers of a CNN typically consist of a series of convolutional layers that convolve with a multiplication or other dot product. The activation function is commonly a rectified linear unit (RELU) layer, and is subsequently followed by additional convolutions such as pooling layers, fully connected layers and normalization layers, referred to as hidden layers because their inputs and outputs are masked by the activation function and final convolution.

In some embodiments, the convolutional layers convolve the input and pass its result to the next layer. When passing the image frames through the convolutional layers, the image frames become abstracted to a feature map. In some embodiments, the CNN may include local or global pooling layers to streamline the underlying computation. In this regard, pooling layers reduce the dimensions of the data by combining the outputs of neuron clusters at one layer into a single neuron in the next layer. In some embodiments, the fully connected layers operate on a flattened input where each input is connected to all the neurons. Coordination among these layers helps in the extraction of useful features from the images. Using CNN algorithms, these extracted features may be used to classify image frames, detect objects within each image frame, and localize the presence of each objects within the image frames. Examples of CNN algorithms used for object detection and localization may include, but are not limited to, R-CNN, Fast R-CNN, Faster R-CNN, YOLO, and/or the like. In embodiments contemplated herein, any application CNN algorithm capable of image classification, and object detection and localization may be used.

In some embodiments, by implementing the applicable CNN algorithm, the system may be configured to identify each object present in the one or more image frames. Once the objects are identified, the system may be configured to determine whether any of the identified objects may be associated with sensitive information. Sensitive information may be any data that must be guarded from unauthorized access and/or unwarranted disclosure in order to maintain the information security of an individual or an entity. Examples of sensitive information may include personal information—any data linked to a specific individual capable of causing identity exposure, business information—intellectual property of the business, classified information, and/or the like.

In some embodiments, the system may be configured to access an object repository to retrieve one or more archived objects that have been categorized as having sensitive information. In response, the system may be configured to compare each object that has been identified to be present on the one or more image frames with the archived objects to determine a match. In one example, the CNN algorithm may identify that the one or more image frames include an identifiable face (object) of an individual. Such identifiable faces, as a category, may be considered as sensitive information that require obfuscation. In another example, the CNN algorithm may identify the object in the one or more image frames to be logo. However, not all logos are considered to be sensitive information to the entity associated with the audiovisual file. The entity may not want to display the logos of competing businesses, but may be willing to display the logos of businesses that are not in direct competition with them. In such cases, the objects that are categorized as logos need to undergo additional processing to identify which entity the logo is associated with.

Next, as shown in block 206, the process flow includes initiating an audio word2vec algorithm on the audio component to identify one or more sensitive portions in the audio component. Typically, word2vec (word to vector) algorithms are used to transform each word (in text) into a vector of fixed dimensionality. An audio word2vec algorithm may be used to represent variable-length audio segments by vectors with fixed dimensionality. In some embodiments, the system may be configured to segment the audio component, using the audio word2vec algorithm, into one or more audio portions. Each audio portion may be a word, a phrase, a sentence, or a combination thereof. In response to segmenting the audio component, the system may be configured to initiate a vectorization engine on the one or more audio portions. In one aspect, the vectorization engine may be used to map the one or more audio portions into a one or more fixed length audio portion vectors capable of being represented in a vector space. By initiating the vectorization engine on the audio portions, the system may be configured to transform the audio portion represented by a variable-length sequence of acoustic features such as mel frequency cepstral coefficients (MFCCs) into a vector representation of fixed dimensionality. In embodiments contemplated herein, the system may be configured to use any natural language processing or speech recognition algorithms, such as recurrent neural networks (RNNs), or any class of neural networks that are capable of modeling sequence data such as time series or natural language in association with the vectorization engine to vectorize the audio portions.

In some embodiments, the system may be configured to electronically retrieve one or more pre-defined audio segments from an audio archive, wherein the one or more pre-defined audio segments are known to be associated with sensitive information. In response, the system may be configured to initiate a vectorization engine on the one or more pre-defined audio segments. In response, the system may be configured to map, using the vectorization engine, the one or more pre-defined audio segments into one or more fixed length pre-defined audio segment vectors capable of being represented in the vector space.

In response to vectorizing the audio portions extracted from the audio component, the system may be configured to determine a distance similarity metric between each of the one or more fixed length audio portion vectors and the one or more fixed length pre-defined audio segment vectors. Distance similarity metric may be a distance measure with dimensions representing features of the objects in vector space. If distance is small, two objects are very similar where as if distance is large the objects have a low degree of similarity. Examples of distance similarity metric may include, but is not limited to Euclidean distance, Manhattan distance, Cosine distance, and/or the like. In response to determining the distance similarity metric, the system may be configured to compare the distance similarity metric with a predetermined threshold. In response to comparing the distance similarity metric with a predetermined threshold, the system may be configured to determine at least a portion of the one or more audio portions with distance similarity metric that is less than the predetermined threshold. In response, the system may be configured to determine that the one or more sensitive portions in the audio component are at least the portion of the one or more audio portions with the distance similarity metric that is less than the predetermined threshold.

Next, as shown in block 208, the process flow includes initiating a masking algorithm on the one or more image frames and the audio component. In some embodiments, for the one or more sensitive portions in the one or more image frames, the masking algorithm may be configured to visually mask the visibility of one or more sensitive portions (objects) in the image frame. In one aspect, the system may be configured to initiate the masking algorithm to visually mask the visibility of the one or more sensitive portions by introducing another image in the same spatial location of the one or more sensitive portions in the one or more image frames. In another aspect, the system may be configured to initiate the masking algorithm to visually mask the visibility of the one or more sensitive portions by introducing a filtering function to blur the one or more sensitive portions on the one or more image frames. By masking the sensitive portions on the image frames, the system may be configured to render the sensitive portions to be invisible or appear to have reduced contrast or lightness. In some other embodiments, for the one or more sensitive portions (objects) in the audio component, the masking algorithm may be configured to visually mask the acoustic perception of the one or more sensitive portions in the audio component. In one aspect, the system may be configured to initiate the masking algorithm to acoustically mask the perceptibility of the one or more sensitive portions of the audio component by introducing another audio snippet in the same temporal location of the one or more sensitive portions of the audio component. In another aspect, the system may be configured to initiate the masking algorithm to acoustically mask the perceptibility of the one or more sensitive portions of the audio component by introducing a filtering function to blur the one or more sensitive portions of the audio component. By masking the sensitive portions on the audio components, the system may be configured to render the sensitive portions to be imperceptible.

Next, as shown in block 210, the process flow includes generating, using the masking algorithm, a masking action policy. In some embodiments, the masking action policy may define the type of masking action to be implemented, the amount of masking required to render the objects in the image frames and/or the audio components to be successfully masked, spatial (for sensitive portions in the image frames) and temporal (for sensitive portions in the audio components) information required to identify the location where masking is required, and/or any other information required to successfully mask the sensitive portions. In some embodiments, the spatial information may be obtained by determining one or more spatial positions of one or more pixels associated with the one or more sensitive portions in the one or more image frames. In some other embodiments, the temporal information may be obtained by determining one or more time stamps associated with the one or more sensitive portions in the audio component.

Next, as shown in block 212, the process flow includes implementing, using the masking algorithm, the masking action policy on the one or more sensitive portions in the one or more image frames and the one or more sensitive portions in the audio component. To ensure the masking action policy has successfully masked all sensitive portions of the video component and the audio component, the present invention leverages the advantages provided by reinforcement learning. Reinforcement learning is be a specific learning approach in machine learning field that aims to solve problems involving sequential decision making. Typically in reinforcement learning, there is no supervision and instead an agent learns by maximizing rewards. In abstract terms, the agent makes an observation of its environment and estimates a state for which it models and predicts the action to be taken. Once the action is executed, the agent receives a reward (or cost), which will be taken into consideration during future prediction phases. This process may be formalized as a Markov Decision Process (MDP). Examples of reinforcement learning algorithms may include, but is not limited to, Q-learning, State-Action-Reward-State-Action (SARSA), Deep Q Network (DQN), Deep Deterministic Policy Gradient (DDPG), and/or the like.

In the context of the present invention, at every iteration in which the masking action policy is implemented on the sensitive portions of an image frame (e.g., first frame of the many image frames that are associated with the video component), the state of the image frame changes. This state is observed by an autonomous engine, which acts, directing its activity towards updating the masking action policy. The action that is executed is the implementation of the masking algorithm to mask the sensitive portions in the image frames. The implementation of an action in that iteration provides the agent with a cost/reward (a numerical score). The goal of the autonomous agent is to maximize its total (future) reward. This is achieved by adding the maximum reward attainable from future states to the reward for achieving its current state, effectively influencing the current action by the potential future reward. This potential reward is a weighted sum of the expected values of the rewards of all future steps starting from the current state. During this process, and as the autonomous agent aims to maximize its future reward, the autonomous agent updates the masking action policy that dictates which action to take, given a particular state.

Accordingly, in some embodiments, the system may be configured to initiate a reinforcement learning algorithm on the one or more image frames. In doing so, the system may be configured to observe a current state of a first frame. In response, the system may be configured to initiate the masking algorithm on the first frame. In one aspect, the system may be configured to implement, using the masking algorithm, the masking action policy on the first frame to generate a masked first frame. In some embodiments, implementing the masking action policy changes the current state of the first frame to a next state, where the next state becomes a current state of the masked first frame.

In response to generating the masked first frame, the system may be configured to initiate the CNN algorithm on the masked first frame. In response, the system may be configured to determine, using the CNN algorithm, a performance assessment output for the masked first frame based on at least implementing the masking action policy. In some embodiments, the CNN algorithm processes the masked first frame and determines whether the masking action policy has successfully obfuscated the sensitive portions in the first frame, and generates the performance assessment output in response. In this regard, the performance assessment output may identify one or more sensitive portions of the first frame that have undergone masking, a likelihood that the one or more sensitive portions are identifiable, a success rate associated with the masking type, and/or the like. In some embodiments, once the performance assessment output has been generated, the system may be configured to initiate an optimization policy engine on the performance assessment output for the masked first frame to optimize the masking action policy. In response, the system may be configured to encode, using the optimization policy engine, the performance assessment output for the masked first frame into rewards and costs. In this regard, in some embodiments, the system may be configured to compare one or more spatial positions of one or more pixels that have been masked in the masked first frame with the one or more spatial positions of the one or more pixels associated with the one or more sensitive portions in the first frame. In response, the system may be configured to determine a match between the one or more spatial positions of the one or more pixels that have been masked in the masked first frame and the one or more spatial positions of the one or more pixels associated with the one or more sensitive portions in the first frame. In response, the system may be configured to assign a reward to the one or more spatial positions of the one or more pixels that have been masked in the masked first frame that matches the one or more spatial positions of the one or more pixels associated with the one or more sensitive portions in the first frame. In addition, the system may be configured to assigning a cost to the one or more spatial positions of the one or more pixels that have been masked in the masked first frame that does not match the one or more spatial positions of the one or more pixels associated with the one or more sensitive portions in the first frame.

In some embodiments, the system may be configured to iteratively initiate optimization policy engine on the performance assessment output for the first frame to optimize the masking action policy at each iteration. In this regard, the system may be configured to encode, using the optimization policy engine, the performance assessment output for the first frame into rewards and costs at each iteration. In response, the system may be configured to aggregate the rewards and the costs from each iteration. Once aggregated, the system may be configured to optimize, with each iteration, the masking action policy based on at least maximizing the aggregated reward and minimizing the aggregated cost. In some embodiments, the system may be configured to aggregate the rewards until the aggregated rewards meets a pre-defined obfuscation threshold. When the aggregated rewards meets the pre-defined threshold, the masking action policy is considered to be optimized. In response, the system may be configured to implement the masking action policy on the rest of the frames in the video component.

In some embodiments, the system may be configured to develop a masking action policy independently for the sensitive portions of the audio component. In one aspect, the system may be configured to implement, using the masking algorithm, the masking action policy on the one or more sensitive portions in the audio component based on at least identifying the sensitive portions in the audio component using the distance similarity metric. Once identified, the sensitive portions are then obfuscated based on at least implementing the masking action policy. Here, the masking action policy may be different from the masking action policy generated to mask the sensitive portions of the image frames, and specific to the sensitive portions in the audio component.

In some embodiments, the system may be configured to optimize the masking action policy for the sensitive portions in the audio component using reinforcement learning, similar to the masking action policy for the sensitive portions for the image frames. In this regard, at each iteration, the system may be configured to determine whether the sensitive portions in the audio components have been successfully obfuscated, and provide a performance assessment output. In one aspect, the system may be configured to implement the audio word2vec algorithm on the sensitive portions in the audio component to vectorize them into fixed-length masked audio portion vectors. Once vectorized, the system may be configured to determine a distance measure metric between the fixed-length masked audio portion vectors and the one or more fixed length pre-defined audio segment vectors. In response, the system may be configured to compare the distance similarity metric with the predetermined threshold, and generate the performance assessment output. The goal is to optimize the masking policy If the distance similarity metric is greater than the predetermined threshold, the masked audio portions are no longer considered to contain sensitive information, and the performance assessment output for that iteration of masking action policy indicates as such. This performance assessment output is encoded into rewards and costs, which are aggregated and used to optimize the masking action policy based on at least maximizing the aggregated reward and minimizing the aggregated cost. In some embodiments, the system may be configured to encode the performance assessment output into rewards if the distance similarity metric between the fixed-length masked audio portion vectors and the one or more fixed length pre-defined audio segment vectors is greater in the current iteration than its corresponding value in the previous iteration. On the other hand, the system may be configured to encode the performance assessment output into costs if the distance similarity metric between the fixed-length masked audio portion vectors and the one or more fixed length pre-defined audio segment vectors in the current iteration is equal to or lesser than its corresponding value in the previous iteration.

Next, as shown in block 214, the process flow includes generating a masked video component and a masked audio component based on at least implementing the masking action policy. By implementing the optimized masking action policy on each of the one or more image frames, the system may be configured to combine, using the video splitter algorithm, the one or more masked frames to generate the masked video component. Similarly, once the optimized masking action policy has been implemented on the audio portions deemed to contain sensitive information, the system may be configured to combine the masked audio portions with other audio portions that do not contain sensitive information in the same temporal scale as the original audio component to generate the masked audio component.

Next, as shown in block 216, the process flow includes binding, using the file editing engine, the masked video component and the masked audio component to generate a masked audiovisual file. The resulting masked audiovisual file will now be free of any sensitive information and ready for broadcasting. In some embodiments, the system may be configured to electronically receive, from a computing device of a user, a request to view the audiovisual file. In response, the system may be configured to initiate one or more processes describe herein to sanitize the audiovisual file to generate the masked audiovisual file. In response, the system may be configured to transmit control signals configured to cause the computing device of the user to display the masked audiovisual file.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for preserving image and acoustic sensitivity using reinforcement learning, the system comprising:
at least one non-transitory storage device; and
at least one processing device coupled to the at least one non-transitory storage device, wherein the at least one processing device is configured to:
electronically retrieve an audiovisual file from a data repository;
initiate a file editing engine on the audiovisual file to separate the audiovisual file into a video component and an audio component, wherein the video component comprises one or more image frames;
initiate a convolutional neural network (CNN) algorithm on the video component to identify one or more sensitive portions in the one or more image frames;
initiate an audio word2vec algorithm on the audio component to identify one or more sensitive portions in the audio component, wherein initiating further comprises:
segmenting, using the audio word2vec algorithm, the audio component into one or more audio portions;
initiating a vectorization engine on the one or more audio portions; and
mapping, using the vectorization engine, the one or more audio portions into a one or more fixed length audio portion vectors capable of being represented in a vector space;
initiate a masking algorithm on the one or more image frames and the audio component;
generate, using the masking algorithm, a masking action policy;
implement, using the masking algorithm, the masking action policy on the one or more sensitive portions in the one or more image frames and the one or more sensitive portions in the audio component;
generate a masked video component and a masked audio component based on at least implementing the masking action policy; and
bind, using the file editing engine, the masked video component and the masked audio component to generate a masked audiovisual file.

2. The system of claim 1, wherein the at least one processing device is further configured to:
initiate a reinforcement learning algorithm on the one or more image frames, wherein initiating further comprises:
observing a current state of a first frame, wherein the first frame is associated with the one or more image frames;
initiating the masking algorithm on the first frame;
implementing, using the masking algorithm, the masking action policy on the first frame to generate a masked first frame, wherein implementing the masking action policy changes the current state of the first frame to a next state, wherein the next state is a current state of the masked first frame;
initiate the CNN algorithm on the masked first frame; and
determine, using the CNN algorithm, a performance assessment output for the masked first frame based on at least implementing the masking action policy.

3. The system of claim 2, wherein the at least one processing device is further configured to:
implement, using the masking algorithm, the masking action policy, wherein implementing further comprises:
determining one or more spatial positions of one or more pixels associated with the one or more sensitive portions in the first frame; and
implement a masking action on at least a portion of the one or more spatial positions of the one or more pixels associated with the one or more sensitive portions in the first frame to generate the masked first frame.

4. The system of claim 3, wherein the at least one processing device is further configured to:
initiate an optimization policy engine on the performance assessment output for the masked first frame to optimize the masking action policy; and encode, using the optimization policy engine, the performance assessment output for the masked first frame into rewards and costs.

5. The system of claim 4, wherein the at least one processing device is further configured to:
encode the performance assessment output into rewards and costs, wherein encoding further comprises:
comparing one or more spatial positions of one or more pixels that have been masked in the masked first frame with the one or more spatial positions of the one or more pixels associated with the one or more sensitive portions in the first frame;
determine a match between the one or more spatial positions of the one or more pixels that have been masked in the masked first frame and the one or more spatial positions of the one or more pixels associated with the one or more sensitive portions in the first frame;
assigning a reward to the one or more spatial positions of the one or more pixels that have been masked in the masked first frame that matches the one or more spatial positions of the one or more pixels associated with the one or more sensitive portions in the first frame; and
assigning a cost to the one or more spatial positions of the one or more pixels that have been masked in the masked first frame that does not match the one or more spatial positions of the one or more pixels associated with the one or more sensitive portions in the first frame.

6. The system of claim 5, wherein the at least one processing device is further configured to iteratively initiate the optimization policy engine on the performance assessment output for the first frame to optimize the masking action policy at each iteration, wherein iteratively initiating further comprises:
encode, using the optimization policy engine, the performance assessment output for the first frame into rewards and costs at each iteration;
aggregate the rewards and the costs from each iteration; and
optimize, with each iteration, the masking action policy based on at least maximizing the aggregated reward and minimizing the aggregated cost.

7. The system of claim 1, wherein the at least one processing device is further configured to:
electronically retrieve one or more pre-defined audio segments from an audio archive, wherein the one or more pre-defined audio segments comprises sensitive information;
initiate the vectorization engine on the one or more pre-defined audio segments; and
map, using the vectorization engine, the one or more pre-defined audio segments into one or more fixed length pre-defined audio segment vectors capable of being represented in the vector space.

8. The system of claim 7, wherein the at least one processing device is further configured to:
determine a distance similarity metric between each of the one or more fixed length audio portion vectors and the one or more fixed length pre-defined audio segment vectors;
compare the distance similarity metric with a predetermined threshold; and
determine the one or more sensitive portions in the audio component based on at least comparing the one or more distance similarity metrics with the predetermined threshold.

9. The system of claim 8, wherein the at least one processing device is further configured to:
determine at least a portion of the one or more audio portions with distance similarity metric that is less than the predetermined threshold; and
determine that the one or more sensitive portions in the audio component are at least the portion of the one or more audio portions with the distance similarity metric that is less than the predetermined threshold.

10. The system of claim 9, wherein the at least one processing device is further configured to:
implement, using the masking algorithm, the masking action policy on the one or more sensitive portions in the audio component.

11. The system of claim 1, wherein the at least one processing device is further configured to:
electronically receive, from a computing device of a user, a request to view the audiovisual file; and
transmit control signals configured to cause the computing device of the user to display the masked audiovisual file.

12. A computer program product for preserving image and acoustic sensitivity using reinforcement learning, the computer program product comprising a non-transitory computer-readable medium comprising code causing a first apparatus to:
electronically retrieve an audiovisual file from a data repository;
initiate a file editing engine on the audiovisual file to separate the audiovisual file into a video component and an audio component, wherein the video component comprises one or more image frames;
initiate a convolutional neural network (CNN) algorithm on the video component to identify one or more sensitive portions in the one or more image frames;
initiate an audio word2vec algorithm on the audio component to identify one or more sensitive portions in the audio component, wherein initiating further comprises:
segmenting, using the audio word2vec algorithm, the audio component into one or more audio portions;
initiating a vectorization engine on the one or more audio portions; and
mapping, using the vectorization engine, the one or more audio portions into a one or more fixed length audio portion vectors capable of being represented in a vector space;
initiate a masking algorithm on the one or more image frames and the audio component;
generate, using the masking algorithm, a masking action policy;
implement, using the masking algorithm, the masking action policy on the one or more sensitive portions in the one or more image frames and the one or more sensitive portions in the audio component;
generate a masked video component and a masked audio component based on at least implementing the masking action policy; and
bind, using the file editing engine, the masked video component and the masked audio component to generate a masked audiovisual file.

13. The computer program product of claim 12, wherein the first apparatus is further configured to:

initiate a reinforcement learning algorithm on the one or more image frames, wherein initiating further comprises:
  observing a current state of a first frame, wherein the first frame is associated with the one or more image frames;
  initiating the masking algorithm on the first frame;
  implementing, using the masking algorithm, the masking action policy on the first frame to generate a masked first frame, wherein implementing the masking action policy changes the current state of the first frame to a next state, wherein the next state is a current state of the masked first frame;
  initiate the CNN algorithm on the masked first frame; and
  determine, using the CNN algorithm, a performance assessment output for the masked first frame based on at least implementing the masking action policy.

14. The computer program product of claim 13, wherein the first apparatus is further configured to:
  implement, using the masking algorithm, the masking action policy, wherein implementing further comprises:
    determining one or more spatial positions of one or more pixels associated with the one or more sensitive portions in the first frame; and
    implement a masking action on at least a portion of the one or more spatial positions of the one or more pixels associated with the one or more sensitive portions in the first frame to generate the masked first frame.

15. The computer program product of claim 14, wherein the first apparatus is further configured to:
  initiate an optimization policy engine on the performance assessment output for the masked first frame to optimize the masking action policy; and
  encode, using the optimization policy engine, the performance assessment output for the masked first frame into rewards and costs.

16. The computer program product of claim 15, wherein the first apparatus is further configured to:
  encode the performance assessment output into rewards and costs, wherein encoding further comprises:
    comparing one or more spatial positions of one or more pixels that have been masked in the masked first frame with the one or more spatial positions of the one or more pixels associated with the one or more sensitive portions in the first frame;
    determine a match between the one or more spatial positions of the one or more pixels that have been masked in the masked first frame and the one or more spatial positions of the one or more pixels associated with the one or more sensitive portions in the first frame;
    assigning a reward to the one or more spatial positions of the one or more pixels that have been masked in the masked first frame that matches the one or more spatial positions of the one or more pixels associated with the one or more sensitive portions in the first frame; and
    assigning a cost to the one or more spatial positions of the one or more pixels that have been masked in the masked first frame that does not match the one or more spatial positions of the one or more pixels associated with the one or more sensitive portions in the first frame.

17. The computer program product of claim 16, wherein the first apparatus is further configured to iteratively initiate the optimization policy engine on the performance assessment output for the first frame to optimize the masking action policy at each iteration, wherein iteratively initiating further comprises:
  encode, using the optimization policy engine, the performance assessment output for the first frame into rewards and costs at each iteration;
  aggregate the rewards and the costs from each iteration; and
  optimize, with each iteration, the masking action policy based on at least maximizing the aggregated reward and minimizing the aggregated cost.

18. A method for preserving image and acoustic sensitivity using reinforcement learning, the method comprising:
  electronically retrieving an audiovisual file from a data repository;
  initiating a file editing engine on the audiovisual file to separate the audiovisual file into a video component and an audio component, wherein the video component comprises one or more image frames;
  initiating a convolutional neural network (CNN) algorithm on the video component to identify one or more sensitive portions in the one or more image frames;
  initiating an audio word2vec algorithm on the audio component to identify one or more sensitive portions in the audio component, wherein initiating further comprises:
    segmenting, using the audio word2vec algorithm, the audio component into one or more audio portions;
    initiating a vectorization engine on the one or more audio portions; and
    mapping, using the vectorization engine, the one or more audio portions into a one or more fixed length audio portion vectors capable of being represented in a vector space;
  initiating a masking algorithm on the one or more image frames and the audio component;
  generating, using the masking algorithm, a masking action policy;
  implementing, using the masking algorithm, the masking action policy on the one or more sensitive portions in the one or more image frames and the one or more sensitive portions in the audio component;
  generating a masked video component and a masked audio component based on at least implementing the masking action policy; and
  binding, using the file editing engine, the masked video component and the masked audio component to generate a masked audiovisual file.

* * * * *